United States Patent [19]

Ide et al.

[11] Patent Number: 4,739,983
[45] Date of Patent: Apr. 26, 1988

[54] DOCUMENT FEEDERS USED WITH IMAGE FORMING APPARATUS

[75] Inventors: Fumito Ide; Yoshimi Miura; Tetsushu Kuwahara, all of Kanagawa, Japan

[73] Assignee: Kabushiki Kaisha Toshiba, Kawasaki, Japan

[21] Appl. No.: 917,267

[22] Filed: Oct. 8, 1986

Related U.S. Application Data

[63] Continuation of Ser. No. 696,718, Jan. 31, 1985, abandoned.

[30] Foreign Application Priority Data

Feb. 21, 1984 [JP] Japan ................................. 59-30704

[51] Int. Cl.⁴ .............................................. B65H 9/04
[52] U.S. Cl. ........................................ 271/233; 271/3;
271/227; 271/258
[58] Field of Search ....................... 271/227, 233, 265;
273/3, 4, 258, 259, 275

[56] References Cited

U.S. PATENT DOCUMENTS

| 4,247,095 | 1/1981 | May ..................................... 271/233 |
| 4,345,751 | 8/1982 | Holzhauser ..................... 271/233 X |
| 4,523,752 | 6/1985 | Kigawa et al. ................. 271/265 X |

FOREIGN PATENT DOCUMENTS

2099406 12/1982 United Kingdom ................ 271/265

Primary Examiner—Andres Kashnikow
Assistant Examiner—Matthew C. Graham
Attorney, Agent, or Firm—Cushman, Darby & Cushman

[57] ABSTRACT

A document feeder for use with an image forming device such as a copy machine. An original document is first transported from an original document feed port toward an original exit port until a trailing end of the original passes a predetermined stop position whereat an imaging operation is to be carried out. By transporting until the trailing end passes the stop position, there is time for a previous original to exit from the original exit port. Then the original document is fed back toward the original feed port until the trailing end of the original is properly positioned so that the document can be imaged.

6 Claims, 12 Drawing Sheets

DOCUMENT FEEDERS USED WITH IMAGE FORMING APPARATUS

This is a continuation of application Ser. No. 696,718, filed Jan. 31, 1985, which was abandoned upon the filing hereof.

BACKGROUND OF THE INVENTION

1. Field of the Invention

This invention relates to document feeders of the type used with an image forming apparatus such as, for example, a copying machine, facsimile machine or document storage machine. The invention includes both apparatus for and methods of document feeding.

2. Description of the Prior Art

A document feeder is generally used to feed an original document sheet (to be copied) to an image forming position on the image forming apparatus whereat the document is imaged. After imaging, the feeder removes the original document from the image forming position so that another original document can be fed to that position. Generally the image forming position is associated with an original glass plate through which the imaging occurs.

In a conventional document feeder, an original document is fed from an original feed port and positioned at a fixed image forming position on the original glass plate. A stopper arrangement is used for stopping the leading edge of an original document sheet fed in a paper feed direction when that leading edge reaches a fixed position. This stopper arrangement is designed to be movable downward by an operation mechanism provided on the main body of an image forming device so that it will not be an obstacle. After the original document has been positioned and the image forming operation is finished, the stopper arrangement is drawn in to permit the original document to exit via an exit port.

In the above discussed conventional construction, positioning is performed by defining the leading edge of the original document to be a reference and by making the stopper arrangement respond to the leading edge. A problem with such an arrangement is that the stopper arrangement becomes an obstacle to the original when it is ready to exit from the image forming position. It is necessary, therefore, to provide some mechanism for releasing the stopping arrangement at the time of exiting of the original document. Such a mechanism is complicated, resulting in operational failures. In addition, such mechanisms tend to be of large size.

As an attempted solution to this problem, a document feeder without a stopper arrangement was proposed. An original document was fed from an original document feed port, transported so that the trailing end of the original document passed a stop position on the original glass plate, and then transported in a reverse direction so that the trailing end of the original became positioned at the stop position. However, that proposed arrangement also had operational difficulties. When an original document fed from the feed port was shorter than normal, it was transported in the reverse direction before the original document already positioned at the stop position had completely exited, thereby interfering with its exit. Another operational problem occurs with longer than normal original documents. When an original is transported based on the distance where the original at the stop position is exited, the trailing end of the original may not pass the stop position if the original fed from the feed port is long.

SUMMARY OF THE INVENTION

The present invention provides a document feeder arrangement that overcomes these problems. An original document is fed from an original feed port toward an original exit port until the trailing end of the original document passes the predetermined position on an original plate and the original document previously on the original plate exits. Then the original document to be positioned is transported in a reverse direction (toward the original document feed port) until the trailing end of the original is document positioned at the stop position.

BRIEF DESCRIPTION OF THE DRAWINGS

These and other objects and advantages of this invention will become apparent and more readily appreciated from the following detailed description of the presently preferred exemplary embodiment read in conjunction with the accompanying drawings, wherein.

DETAILED DESCRIPTION OF THE PRESENTLY PREFERRED EXEMPLARY EMBODIMENT OF THIS INVENTION

Figure 1:
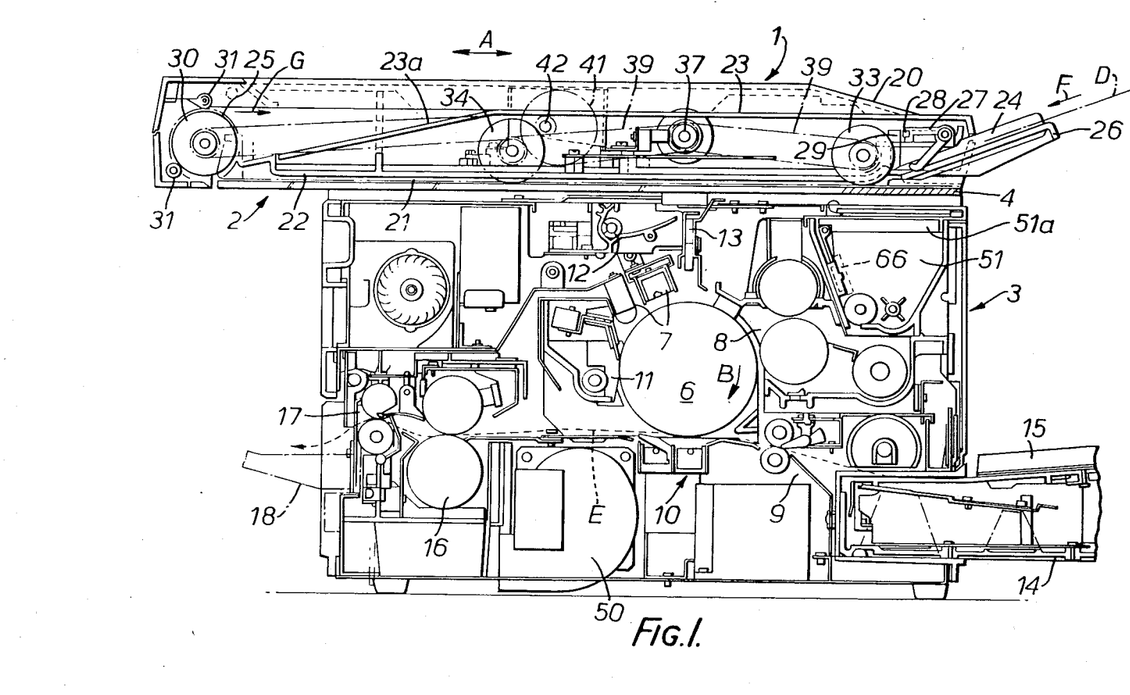
FIG. 1 shows the internal construction of a copying machine including the document feeder of the present invention.

Referring now to FIG. 1, there is shown a cut-away view of a copying machine including a document feeder according to this invention. Document feeder 1 of this invention is provided as an additional (add-on) device to copying machine 3 which carries out an image forming operation, namely a copying operation, by reciprocating an original plate 2 to the right and left as shown by an arrow A. Document feeder 1 is provided on plate 2 so as to cover glass 4 of the plate. When a normal copying operation is performed without using document feeder 1, the feeder is opened sideways at several stages from the use position shown in the drawing to a desired angle position by the action of hinge part 5 (see FIG. 2) of the feeder to expose an original document loading surface.

Copying machine 3 itself is well-known, so the following explanation of the copying machine will be brief. Machine 3 includes chargers 7, developing unit 8, paper feeding device 9, transfer and separation device 10, and cleaning device 11 are provided around photosensitive drum 6 which rotates as shown by an arrow B. An exposure lamp 12 under original plate 2 illuminates an original document D on glass 4. An image of the document is projected as an exposure image through a selfoc lens. This exposure image is imaged as a toner image by unit 8, transferred to a copying paper (now shown in the drawing) fed from paper feed cassette 14 or manual feed part 15 into the main body by device 10, separated from drum 6, transported along transportation path E shown with a broken line, fused with a fuser 16, and exited onto paper exit tray 18 through paper exit rollers 17. The residual toner on drum 6 is scraped away with device 11 to finish one cycle of copying operation of drum 6. Hopper cover 51a is provided on toner hopper 51 in developing unit 8 and opening and closing of cover 51a is detected by hopper cover switch 66.

The optical system of copying machine 3 is of the focusing light transmitter type, but document feeder 1 of this invention can also be applied to a copying machine of the mirror lens type composed of a combination of a mirror and a lens. Under drum 6, motor 50 which is provided as a driving power source of copying machine.

Document feeder 1 includes a frame 20 made of synthetic resins and a floor frame 22 to form a slight parallel clearance between the upper surface of glass 4, which serves as an original passage and a cover 23 which is also used for an exit tray of original document D. In a parallel clearance 21, an image forming position, that is, a normal loading position of original document D is specified on the upper surface of glass 4.

Figure 2:
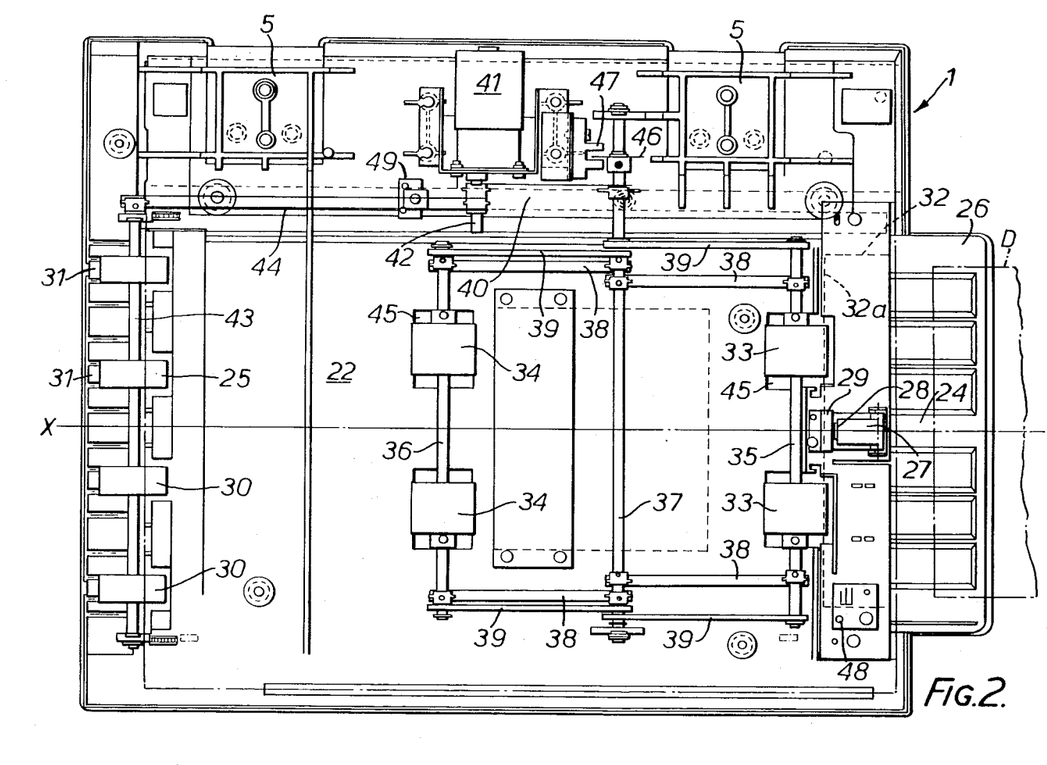
FIG. 2 is a top plan view of the machine shown in FIG. 1.

On one side of the image forming position (the right side as shown in FIGS. 1 and 2), there are provided an original feed port 24 for receiving a sheet-like original document D for example of A4 size, which is shown with chain line, along the direction indicated by arrow F and on the other side (the left side as shown in FIGS. 1 and 2), original exit port 25 for exiting original D in the direction of arrow G after a copying operation is finished. Feed port 24 is guided in a slant direction by a transportation guide 26 and the insertion end of guide 26 is extruded to one end of clearance 21. At the inner position of feed port 24, detecting lever 27 is provided on the original passage to detect passing of original D and a detecting signal is provided by a sensor 29 corresponding to a magnet 28 mounted on lever 27. Lever 27, magnet 28, and sensor 29 constitute a detecting means.

As shown in FIG. 2, exit port 25 and one end of parallel clearance 21 are connected with the guides of 4 exit rollers 30 made of compound rubber at spaced positions and followers 31 of small diameter, which rotatably contact these rollers. The original transported leftward from clearance 21 is guided upward as curved, reaches exit port 25, exits turning in a reverse direction, and laps successively on inclined exit tray part 23a (see FIG. 1) of cover 23.

On the feed port side, a stopper 32 is provided fixed to original plate 2. For this stopper 32, the side corresponding to the trailing end of the original is swollen and end surface 32a has a height sufficient to contact when the trailing end of original D is somewhat floated above the surface of glass 4. Further, as shown in FIG. 2, stopper 32 is belt-shaped in transverse direction to the axial line X—X in longitudinal direction along the feeding direction of original D, and end surface 32a is orthogonal to the axial line X—X to constitute the datum surface on the rear end side of the image forming position. It is preferable that the length in transverse direction of stopper 32 is substantially equal to the width of original D. As shown in the embodiment, stopper 32 may be constructed with individually separated members arranged at spaced positions instead of as a continuous integrated member. In short, it is acceptable to form end surface 32a, which is the datum surface, whole instead of separate members.

Figure 3:
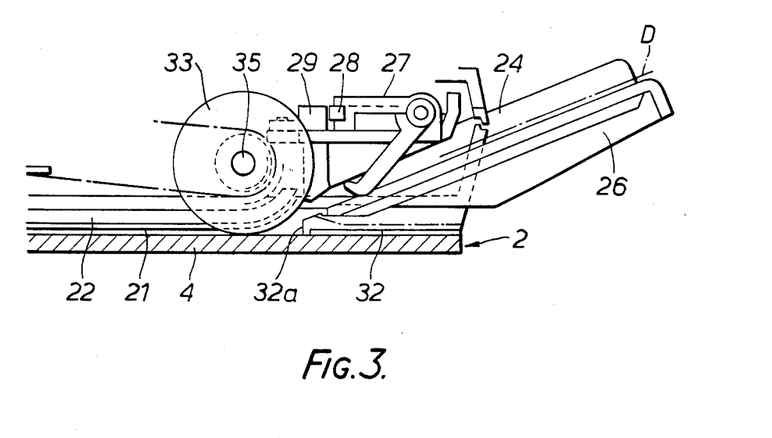
FIG. 3 is a partially enlarged side view of the original feed part.

As shown in FIG. 3, the guide surface of guide 26 is above stopper 32, and guided original D can enter parallel clearance 21 across stopper 32 without disturbance. It is possible to construct guide 26 and stopper 32 as an integrated member.

To transport original D with friction contact, there are provided a pair of transporting rollers 33 arranged at spaced positions adjacent to original feed port 24 and a pair of transporting rollers 34 arranged at spaced positions in substantially the middle of the device. Shafts 35 and 36 to which these rollers 33 and 34 are fixed respectively, are arranged in parallel with intermediate common driving shaft 37, are connected through chain sprocket transportation mechanism 38, are linked to driving shafts 37 in free vertical movement by swinging arm 39, and are placed on original D by self weight. Driving shaft 37 is connected with motor shaft 42 of DC reversible motor 41 through chain sprocket transportation mechanism 40. Further, shaft 43, where exit rollers 30 are fixed, is connected to this motor shaft 42 through chain sprocket transportation mechanism 44.

Accordingly, when motor 41 is rotated forward, both transporting rollers 33 and 34 and exit roller 30 are rotated simultaneously in a clockwise direction in FIG. 1 and transport original D in left a leftward direction, that is in the feed direction. Then, when motor 41 is rotated in a reverse direction, each roller 33, 34 and 30 are rotated in a counterclockwise direction and transport original D in a direction reverse to the feed direction.

Transporting rollers 33 and 34 are exposed downward through openings 45 formed on floor frame 22 and contact original D placed at the image forming position. It is preferable to fabricate rollers 33 and 34 with urethane foam which is light weight and has excellent friction with an original document Rollers 33 and 34 should be made of a white material so that there will be no shadow in a copied image.

As shown in FIG. 2, timing disc 46 is mounted on one end of driving shaft 37. Corresponding to this disc, a sensor 47 is provided on floor frame 22 and the rotation amount of driving shaft 37, that is, the rotation amount of transporting rollers 33 and 34 is pulse counted. Further, sensor 49 is provided adjacent to motor 41 for detecting, by monitoring hinge part 5, if the original loading surface is open. Sensor 49 is, for example, comprised of magnetic sensors.

A lamp 48 is provided on the upper surface of document feeder 1 as an indicating device. This lamp lights in green at original accepting time (when an original document is accepted by the feeder), flickers in red at errors, and goes out if an original document is unacceptable.

Figure 4:
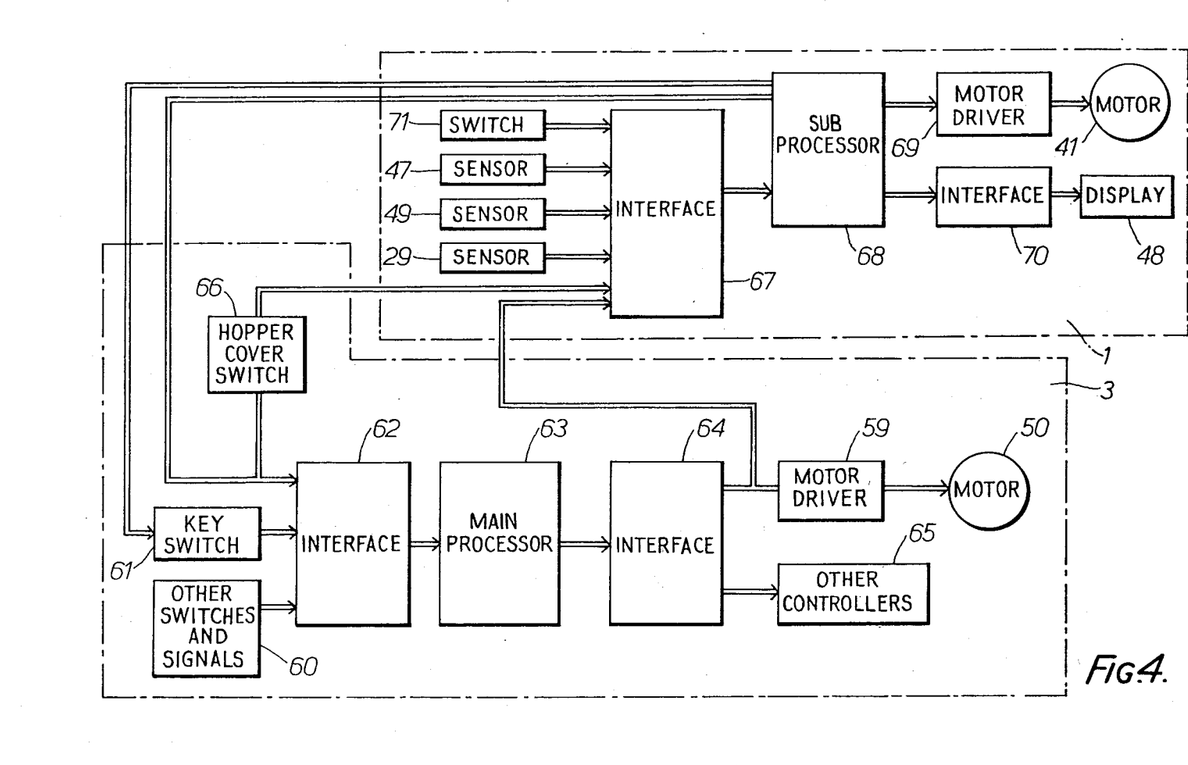
FIG. 4 is a block diagram of a control circuit of the copying machine.

Referring now to FIG. 4, there is shown a block diagram of a control arrangement for controlling the operation of the copying machine.

First, an explanation will be given regarding the control circuit portion 300 relating to copying machine main body 3. Main processor 63 receives signals from an operation panel 61 such as a copying key (not shown in the drawing) and signals from a switch detector 60 through input interface circuit 62 and controls a motor driver 59 an other control device 65 to control the whole copying operation. Main processor 63 is mainly comprised of microprocessors and peripheral circuits and is operated according to a program previously stored in a built-in memory (ROM) to perform various controls. Motor driver 59 drives the motor 50.

Next, an explanation will be given regarding the control circuit portion 100 related to document feeder 1. Subprocessor 68 receives signals from sensors 29, 47, and 49, transportation amount adjusting switch 71 and hopper cover switch 66 to control the whole original feeding operation. Subprocessor 68 is comprised of a microcomputer and is operated according to a program stored in built-in memory (not shown in the drawing) to perform various controls.

Also, subprocessor 68 establishes a flag when insertion of an original is detected by sensor 29. It is reset when the original is exited or when the document feeder 1 is opened and loading of the original can be judged by this flag.

Pulse counters 68a and 68a' and pulse counter 68b are provided in subprocessor 68. Pulse counter 68a counts the number of pulses by sensor 47 and cleared once when motor 41 starts rotation. Pulse counter 68b counts by adding the number of variations of pulse counter 68a, which is observed at every interrupt processing and counts the number of pulses after the trailing end of the original document passes sensor 29. Pulse counter 68a' establishes the count value of pulse counter 68a at previous interrupt processing. Transportation amount adjusting switch 71 is provided on a control board (not shown in the drawing) in document feeder 1. It adjusts the transportation amount (X1) at forward operation and adjusts the transportation amount (X2) at reverse operation. This switch is, for example, comprised of dual-in line package (DIP) switches.

Transportation amount X1 is the number of pulses by sensor 47 showing a transportation amount less than a minimum transportation amount which is required when an applicable "shortest original document" specified by rollers 33 and 34 passes sensor 29. Transportation amount X2 is the number of pulses (including the time to be taken for inserting the original) which is required when an applicable "longest original" specified by rollers 33, 34 and 30 and original plate 2 passes sensor 29. Subprocessor 68 drives DC reversible motor 41 by controlling motor drive 69 and lights lamp 48 by output interphase circuit 70.

Main processor 63 and subprocessor 68 are connected through output interface circuit 64, bus 72, and input interface circuit 67 and also are connected through bus 73 and input interface circuit 62 to send and receive signals. Further, subprocessor 68 outputs copying key operating signals and signals from hopper cover switch 66 to the copying machine portion 300 of the control circuit.

Referring now to the flow charts of FIG. 5 to FIG. 8, there is provided an explanation of the operation of document feeder 1. When a power supply switch (not shown in the drawing) is closed a program previously stored in subprocessor 68 starts to execute and pulse counters 68a, 68a', and 68b are cleared and the system is initialized at step (ST1). Next, subprocessor 68 reads the contents of transportation amount adjusting switch 71 and establishes transportation amount adjust values X1 and X2 (ST2). Then, subprocessor 68 judges if it is possible to carry out an original feeding operation (ST3). The original feed operation condition in this case means that motor 50 of copying machine 3 is stopped and that sensor 49 detects that original plate 2 is closed. Further, subprocessor 68 judges by flag display whether an original is set on the original plate and if a copying operation is performed by the signal from main processor 63 (ST4). As the result, subprocessor 68 returns to step ST2 when an original is set on original plate 2 and a copying operation of the original has not yet been performed. Also, when a copying operation is performed or when the original is not set on original plate 2, subprocessor 68 lights lamp 48 in green to display that the original is acceptable (ST5). In this case, when it is detected by sensor 29 that the original is inserted in original feed port 24 (ST6), subprocessor 68 proceeds to original feeding operation (ST8'). Or, when the insertion is not detected, subprocessor 68 judges if the original is set on original plate 2 (ST7). If the original is not set on the plate, it returns to step 2 and if set, it sets the flag for exit operation only to "1" (ST8) and proceeds to original feeding operation (ST8'). Steps ST2–ST7 are a standby routine for waiting until the conditions of the original feeding operation becomes complete.

Figure 6:
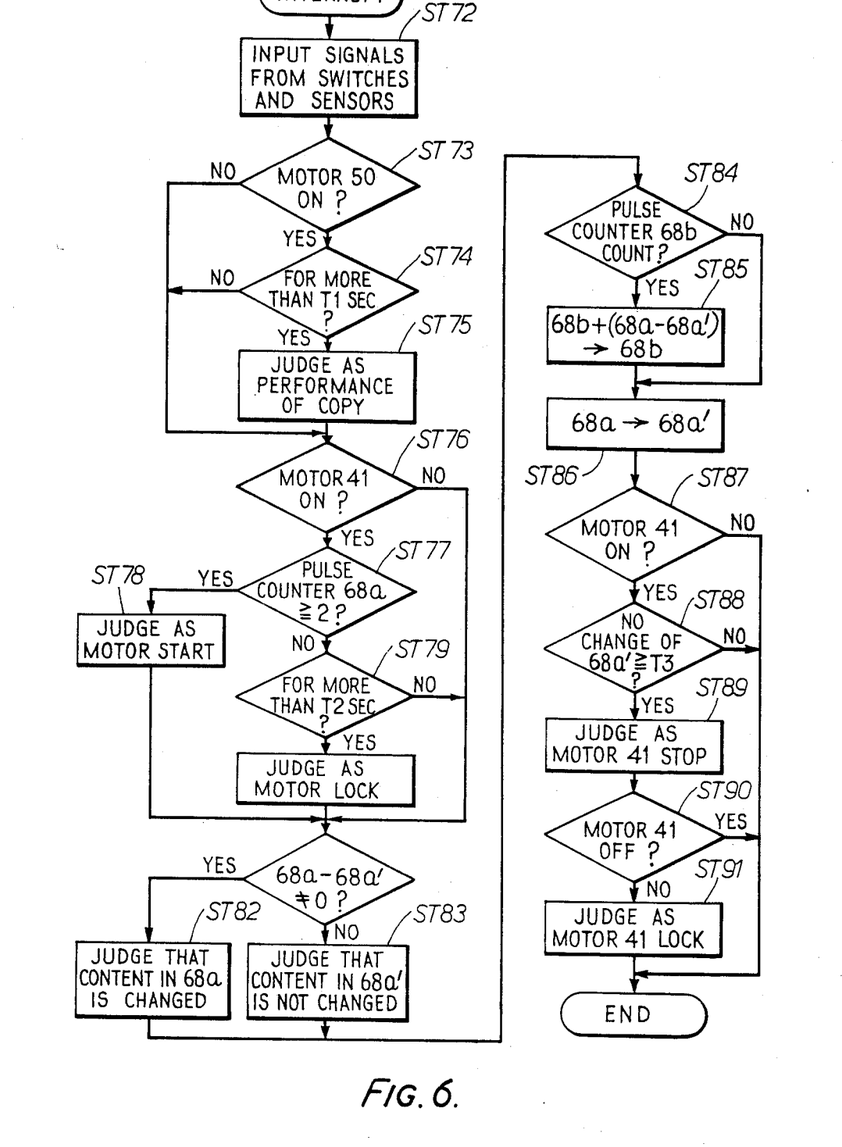

Referring now to FIG. 6, there is shown a flow chart of interrupt processing. Interrupt processing means that an interrupt is generated between normal program flows at a fixed cycle, and the flow is stopped to permit execution of the interrupt processing program, and then the flow returns to processing of the program that had been interrupted. When the interrupt processing is generated, the signals from detector 60 are supplied to subprocessor 68 through main processor 63, and the signals from sensors 29, 47 and 49 are supplied to subprocessor 68 (ST72). Then, subprocessor 68 judges that a copying operation was performed when motor 50 was on for more than T1 seconds (ST73–ST75). Subprocessor 68 checks if an ON signal of form motor 41 is output (ST76). Judging the output of the ON signal, it judges if the count value of pulse counter 68a is 2 or more (ST77). When the count value is 2 or more, subprocessor 68 judges that motor 41 started rotation (ST78). When the count value is less than 2, subprocessor 68 judges if a fixed time (time T2) elapsed after motor 41 is ON (ST79). When the count value of pulse counter 68a is not 2 or more within time T2, it judges that motor 41 is locked (ST80). Then, subprocessor 68 checks if the variation of pulse counter 68a, that is, the value of pulse counter 68a' the previous interrupt coincides with the value of pulse counter 68a at the present interrupt present (ST81). When there is coincidence, it judges that no change is present (ST83) and where there is no coincidence, it judges that change is observed (ST82). Next, when subprocessor 68 looks at the counters (ST84), the difference in content between pulse counter 68a and pulse counter 68a' is added to pulse counter 68b (ST85). In this case, subprocessor 68 stores the count value at pulse counter 68a of this time in pulse counter 68a' (ST86).

Then, subprocessor 68 checks at ST87 if motor 41 starts rotation in steps ST76–ST78. When rotated, it checks pulse counter 68a for variation and if the variation of pulse counter 68a is T3 or more (ST88), and when this condition is satisfied, it judges that motor 41 is stopped (ST89). Next, subprocessor 68 checks if the ON signal of the motor is output. When it is judged that motor 41 is stopped in step 89 although this signal is output, processor 68 judges that motor 41 is locked due to error (ST90, 91).

Next, in taking consideration of the above interrupt processing and referring to FIG. 7(a)–(e), there is provided a flow chart of an original feeding operation.

Figure 7A:
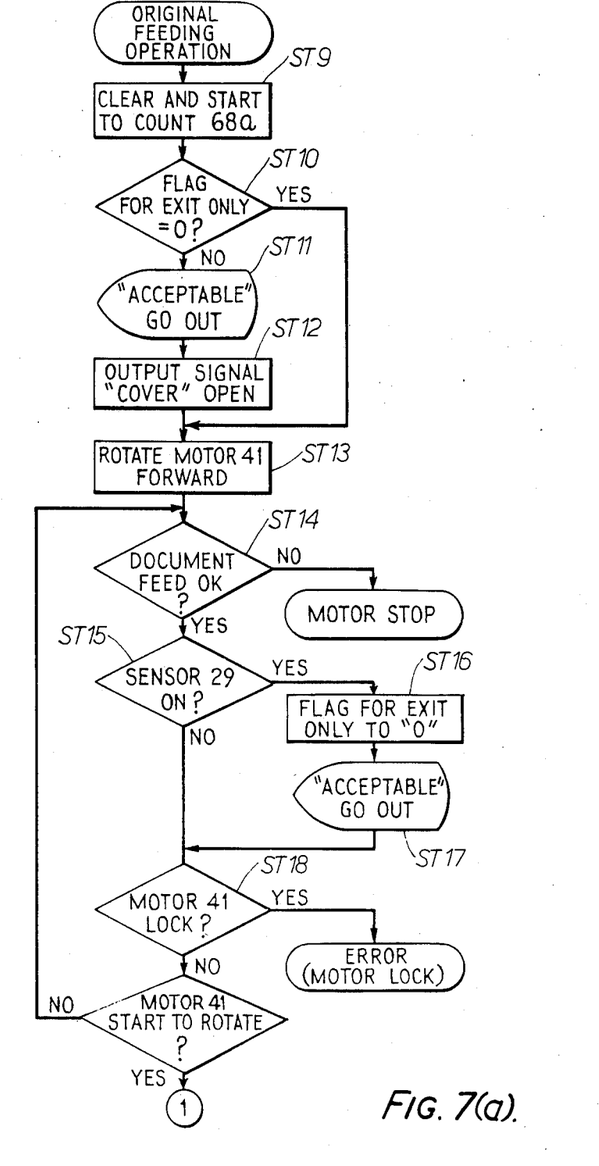

Subprocessor 68 clears pulse counter 68a and starts counting (ST9). (In this case, motor 41 is not yet rotated, and the count is "0" until it starts rotation.) Subprocessor 68 checks if the flag for exit operation only is set to "1" (ST10). When "0", it turns off lamp 48 (ST11) and outputs a signal that hopper cover 51a is opened to main processor 63 (ST12). By this signal, main processor 63 inhibits starting of a copying operation by the copying key (not shown in the drawing). Next, subprocessor 68 rotates motor 41 forward (ST13).

Figure 5:
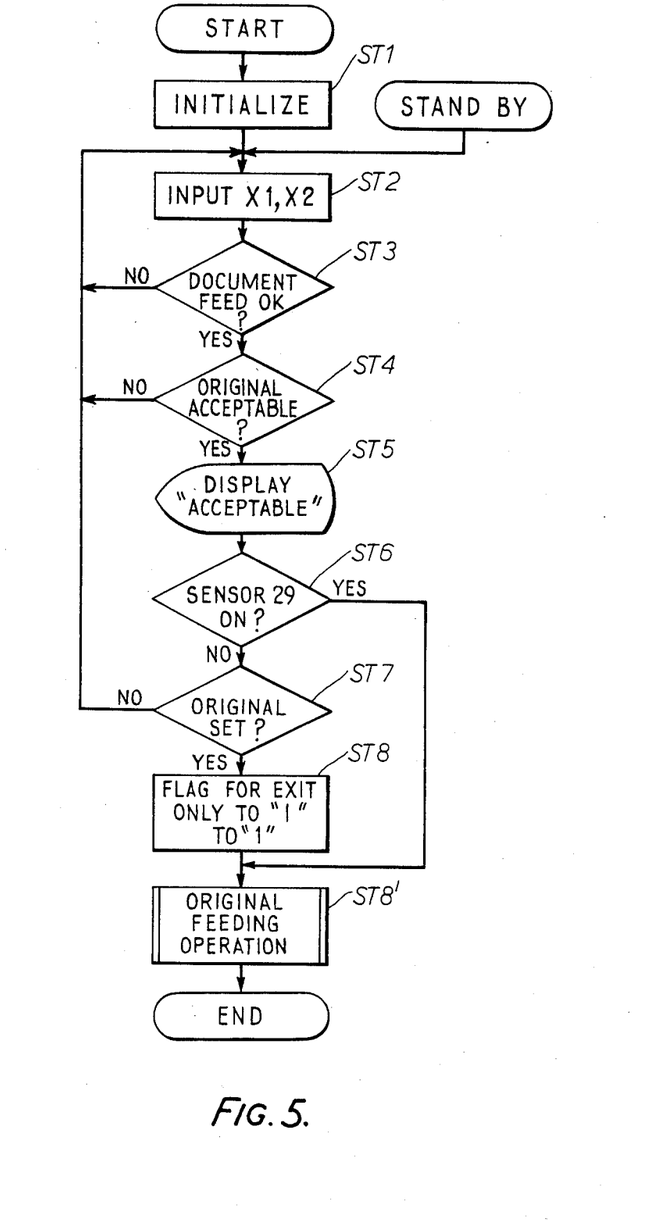
FIGS. 5, 6, 7(a), 7(b), 7(c), 7(d), 7(e), and 8 are flow charts explaining the operation of the invention.

Then, subprocessor 68 judges at step (ST14) if it is possible to perform the original feeding operation in the same manner as in step ST3 (FIG. 5). When impossible, it stops motor 41 and when possible, it proceeds to the next step. Next, subprocessor 68 checks if sensor 29 is ON (ST15). When ON, it judges that the original is inserted, sets the flag for exit operation to "0" (ST16) and turns off lamp 4 (ST17). Further, subprocessor 68 checks if it is judged that motor 41 is locked or if the motor starts rotation in steps 76–80 (ST18 and 19). When motor 41 starts rotation, subprocessor 68 proceeds to step ST20. Steps ST14–ST19 constitute a loop for judging if the motor 41 starts rotation.

As described before, subprocessor 68 judges if it is possible to perform an original feeding operation (ST20). When impossible, it stops motor 41 and when possible, it proceeds to the next step. Next, subprocessor 68 checks if sensor 29 is ON (ST21). When OFF, it checks if the flag for exit operation only is set to "1" (ST22'). When the flag is set to "0" and is not for exit operation only, it stops motor 41 and when the flag is set to "1", it proceeds the step 25.

Also, when sensor 29 is ON in step 21, subprocessor 68 checks if the flag for exit operation only is "1" (ST22). When the flag is "0", it proceeds to step 25 and when the flag is "1", it judges that the original is inserted, sets the flag for exit operation only to "0" and establishes the contents of pulse counter 68a on pulse counters 68a' and 68b (ST23). Then, subprocessor 68 turns off lamp 4 (ST24).

Figure 7B:
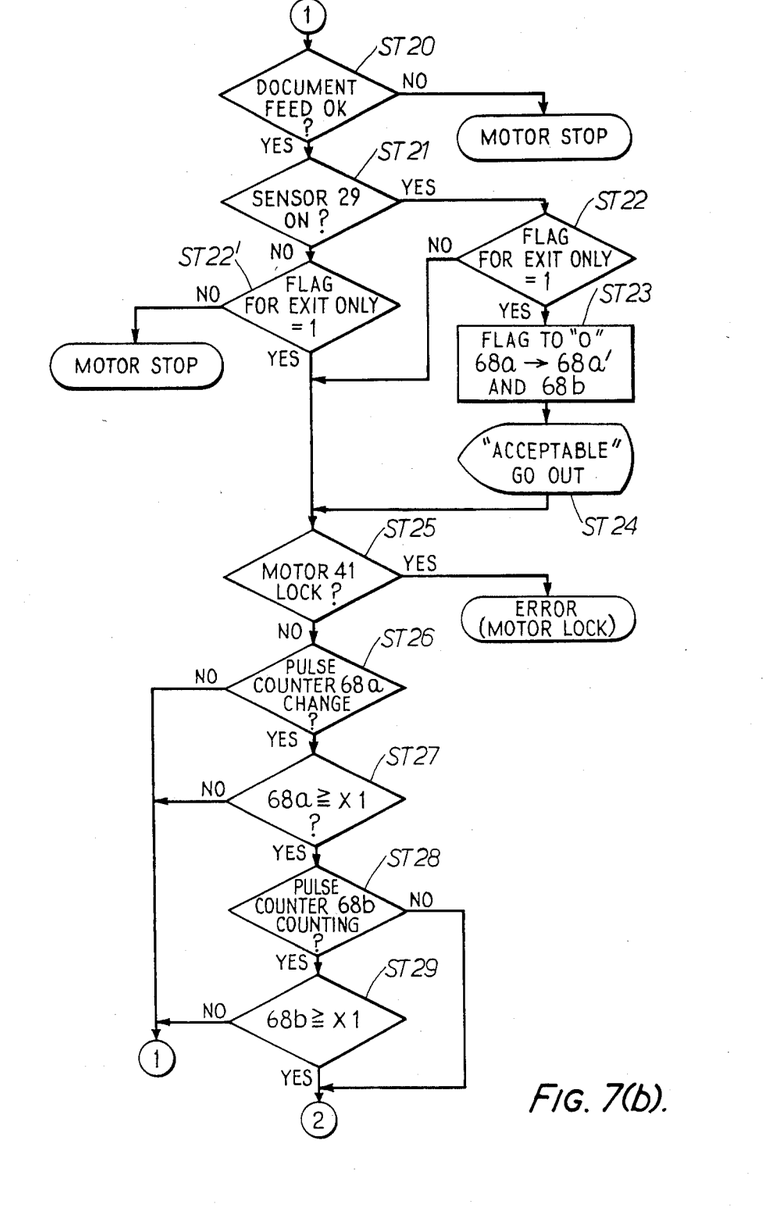

Next, in step 25, subprocessor 68 judges if motor 41 is locked (ST25). Then, subprocessor 68 checks if the count value of pulse counter 68a is changed in the previous interrupt processing (ST26). When changed, it checks if the count value of pulse counter 68a is more than transporting amount X1 (ST27) and when more than X1, it checks if pulse counter 68b is under counting (ST28). When under counting, it checks if the count value of pulse counter 68b is more than transporting amount X1 (ST29). When more than X1 and when pulse counter 68b is not counting in step 28, it proceeds to step 30. In this case, when the count value of pulse counter 68a is not changed in interrupt processing in above step 26, when the count value of pulse counter 68a is less than transporting amount X1 in step 27, and when the count value of pulse counter 68b is less than transporting amount X1 in step 29, it returns to step 20. Above steps 26 to 29 are for judging that the original is transported by transporting amount X1. Normally, when the count value of pulse counter 68a is more than X1 in step 27, it proceeds step 30, but when sensor 29 becomes ON during operation of paper exit only, pulse counter 68b begins counting, and it continues the loop with step 20 until the count value of pulse counter 68b becomes more than X1. Therefore, when pulling out the original from original feed port 24 while it is transported by X1 after it is inserted and not after motor 41 starts operation, the operation is stopped.

Steps ST20–ST29 constitute a loop for stopping motor 41 to permit reinsertion of the original when sensor 29 becomes OFF for reinserting the original while the count value of pulse counters 68a and 68b corresponds to the above transporting amount X1 respectively.

In step ST30, subprocessor 40 checks if document feeder 1 is operable. When inoperable, it stops motor 41 and when operable, it proceeds to the next step. Then, subprocessor 68 checks if motor 41 is locked (ST31). When the motor is rotated, it checks if sensor 29 is ON (ST32). When sensor 29 is OFF, it proceeds to step 37 and when sensor 29 is ON, it proceeds to step 33. Next, subprocessor 68 checks if the count value of pulse counter 68a is changed in interrupt processing (ST33). When changed, it checks if the count value of pulse counter 68a is more than transporting amount X2 (ST34). when more than X2, it checks if pulse counter 68b is counting (ST35). When counting, it checks if the count value of pulse counter 68b is more than transporting amount X2 (ST36). When more than X2 and when pulse counter 68b is not counting in step ST35, it signals an error due to jamming. Also, when the count value of pulse counter 68a is not changed in interrupt processing in step ST38, when the count value of pulse counter 68a is less than transporting amount X2 in the step ST34, and when the count value of pulse counter 68b is less than transporting amount X2, it returns to step ST30. Therefore, ST30–ST36 constitute a loop for detecting the trailing end of the original and also for checking jamming of the original.

Figure 7C:
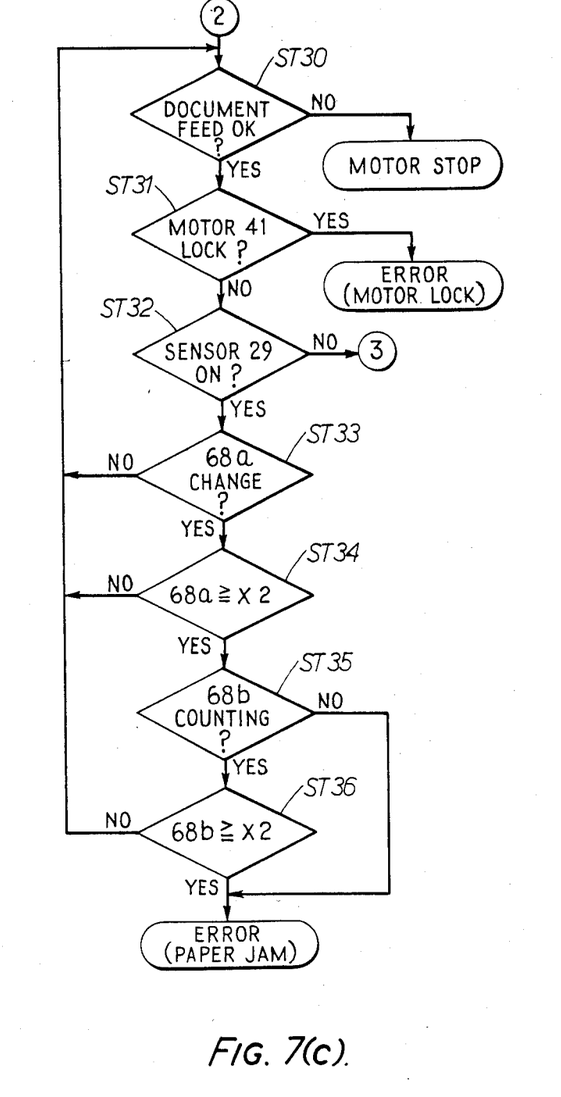

When the trailing end of the original passes sensor 29, that is, when sensor 29 is ON in step 32, subprocessor 68 clears pulse counter 68b and then starts counting (ST37). This is for checking to what position the trailing end of the original is transported. Next, subprocessor 68 checks if sensor 29 is ON (ST38). When ON, it checks if the flag for exit operation only is "1" (ST39). When "1", it returns to step 19. When sensor 29 is OFF in step ST38 or when the flg is "0" in step 39, subprocessor 68 checks if the motor 41 is locked (ST40). When motor 41 is rotated, it checks if document feeder 1 is operable (ST41). When inoperable, it stops motor 41 and when operable, it proceeds to the next stage. Next, subprocessor 68 checks if the count value of pulse counter 68a is changed in interrupt processing (ST42). When changed, it checks if the count value of pulse counter 68b is more than "X3−X1" (X3 is the value which the trailing end of the original reaches up to a point over the stop position when it is transported by X3 pulses after passing sensor 29 and X1 is above the transportation adjusting amount) (ST43) and when the above value is satisfied, it proceeds to step ST44. In this case, when the count value of pulse counter 68a is not changed in interrupt processing in step 42 and when the count value of pulse counter 68b is less than "X3−X1" in step 43, it returns to step 38. Steps ST38 and ST43 constitute loops for transporting a fixed amount after the trailing end of the original passed sensor 29.

Next, subprocessor 68 checks if sensor 29 is ON (ST44) When ON, it checks if the flag for exit operation only is "1" (ST45) and when "1", it returns to step ST19. Also, when sensor 29 is OFF in step ST44 or when the flag is "0" in step ST45, subprocessor 68 checks if motor 41 is locked (ST46). When motor 41 is rotated, it checks if document feeder 1 is operable (ST47). When unoperable, it stops motor 41 and when inoperable, it proceeds to the next step. Then, subprocessor 68 checks if the count value of pulse counter 68a it changed in interrupt processing (ST48). When changed, it checks if the count value of pulse counter 68a is more than "X4−X1" (X4 is the value where allowance is added to the value necessary for exiting the original set on original plate 2 securely and X1 is the transportation adjusting amount) (ST49). When the above value is a satisfactory one, it proceeds to step ST50. In this case, when the count value of pulse counter 68a is not changed in interrupt processing in step 48 and when the count value of pulse counter 68b is less than "X4−X1" in step 49, it returns to step 44. Steps 44 to 49 comprise a loop for transporting, under normal operating conditions the original unit it is exited.

Figure 7D:
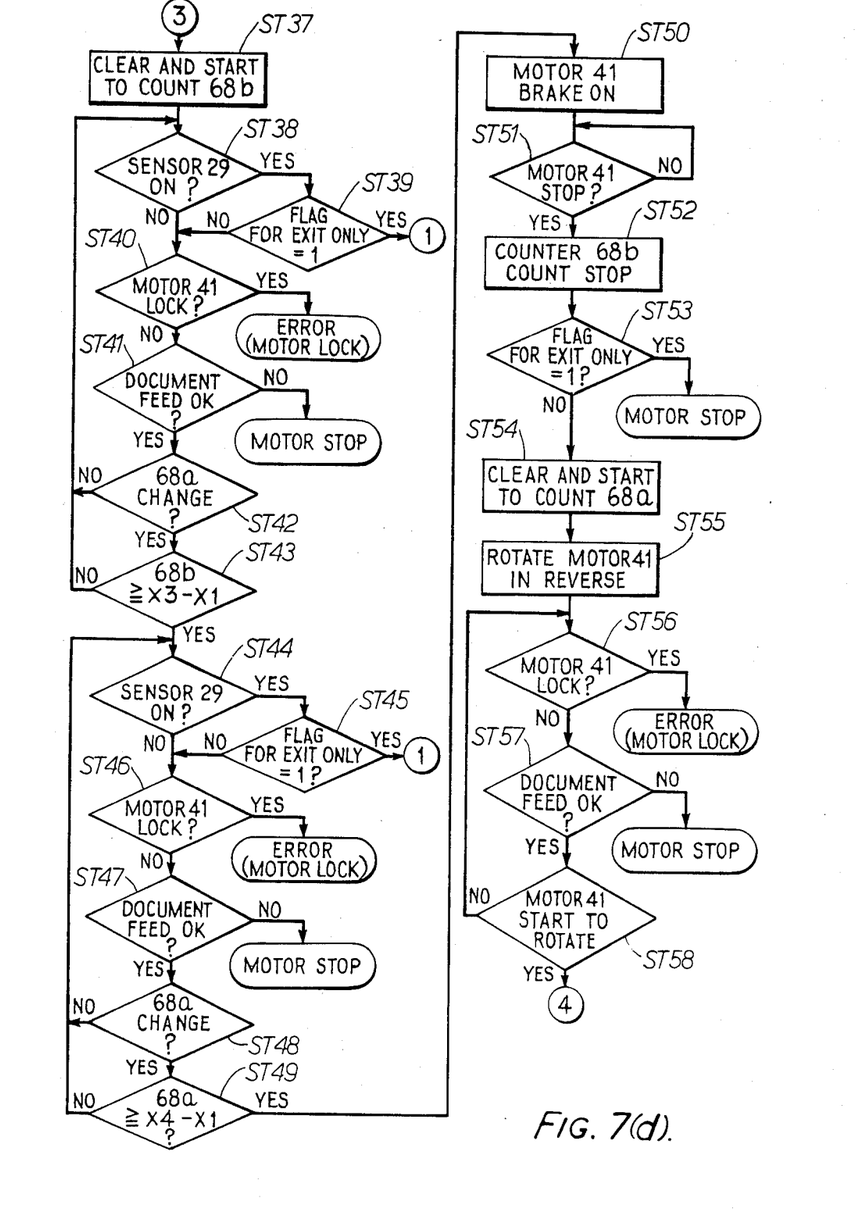

Thus, when subprocessor 68 judges that the above two conditions are satisfied and that motor forward rotation is finished, it brakes motor 41 (ST50) and waits until it is judged that the motor is stopped (ST51). When motor 41 is stopped, subprocessor 68 stops the counting of subprocessor 68b (ST52). When the flag for exit operation is "1", it proceeds to the motor stopper for finishing the operation (ST53). When an original is inserted, it clears the pulse counter 68a, starts counting (ST34), and rotates motor 41 in the reverse direction (ST55).

Next, subprocessor 68 checks if motor 41 is locked (ST56). When motor 41 is rotated, it checks if document feeder 1 is operable (ST57). When inoperable, it stops motor 41 and when operable, it checks if motor 41 starts rotation (ST58). When motor 41 does not start rotation in step ST58, it returns to step ST56. Steps ST56–ST58 constitute a loop for judging it motor 41 starts rotation.

Figure 7E:
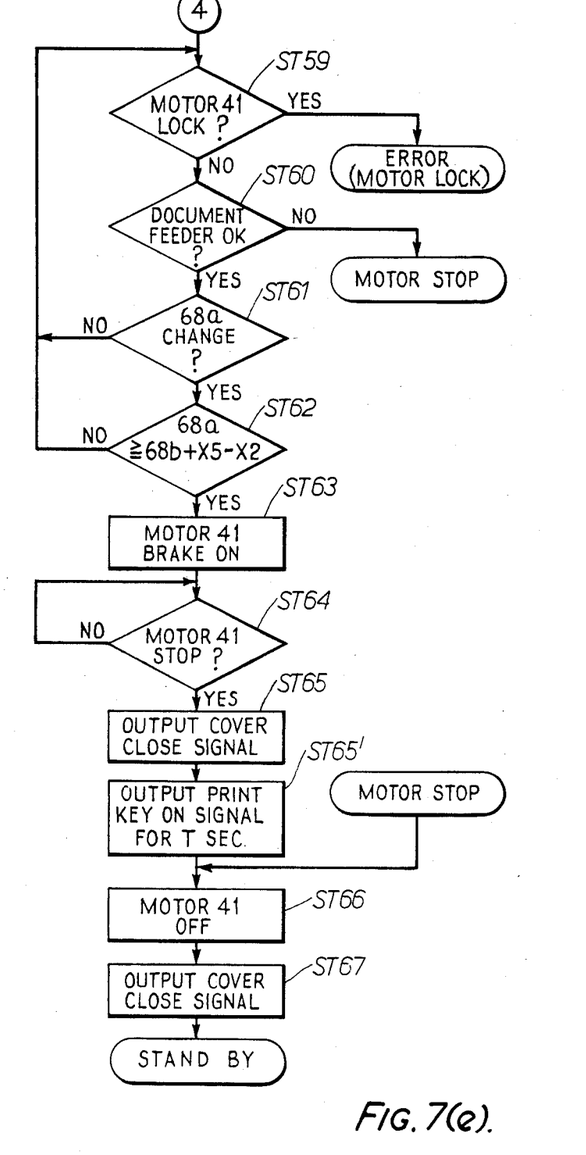

When judging that motor 41 starts rotation in step ST58, subprocessor 68 checks whether motor 41 is locked (ST59). When the motor is rotated, it checks if document feeder 1 is operable (ST60). When inoperable, it stops motor 41 and when operable, it proceeds to the next step. Then, subprocessor 68 checks if the count value of pulse counter 68a is changed in interrupt processing (ST61). When changed, it checks if the count value of pulse counter 68a is more than "the count value of pulse counter 68b+X5−X2" (the value of pulse counter 68b at this time is the transporting amount after the trailing end of the original passed sensor 29, X5 is the value where allowance is added to the number of pulses for transporting the trailing end of the original to stopper 32 securely, and X2 is said transportation adjusting amount) (ST62). When the above value is a satisfactory one, it proceeds to step ST63. In this case, when the count value of pulse counter 68a is not change in interrupt processing in step 61 and when the count value of pulse counter 68a is less than "the count value of pulse counter 68b+X5−X2" in step 62, it returns to step ST59. Steps ST59–ST62 constitute a loop for transporting the original until the trailing end of the original reaches stopper 32.

Next, subprocessor 68 brakes motor 41 (ST63) and waits until it is judged that the motor is stopped (ST64). When motor 41 is stopped, subprocessor 68 judged that the original is set at a fixed position on original table 2 and outputs the signal showing closing of the hopper cover to main processor 63 for permitting operation of the main body (ST65) and also the same signal as closing the printing key for T seconds (ST 65') to start copying operation of the main body.

Next, subprocessor 68 turns motor 41 OFF (ST66), and outputs a hopper cover closing signal to main processor 63 (ST67).

Figure 8:
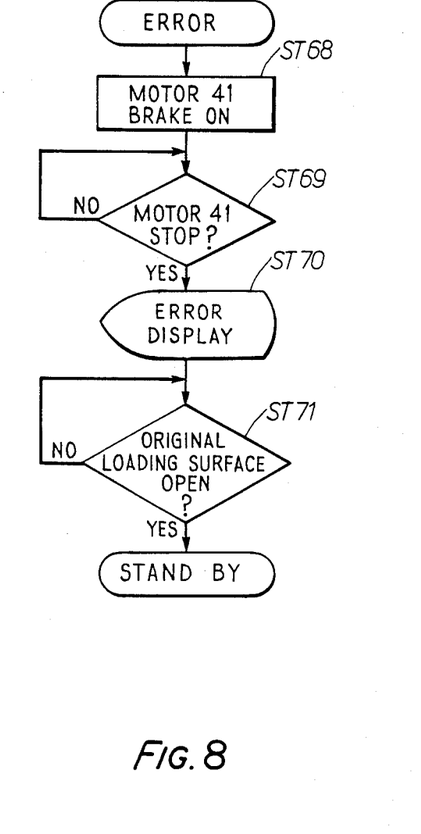

As shown in FIG. 8, when the motor is locked and when error occurs due to jamming, subprocessor 68 brakes motor 41 (ST68). When it is detected that motor 41 is stopped (ST69), it flickers lamp 48 in red to display the error (ST70). When it is detected by sensor 49 that document feeder 1 is open according to the indication of error, subprocessor 68 releases the error (ST71) and returns to the standby routine.

As described above, when the original feeding operation is started, the motor is rotated forward until the condition for exiting the original when it is set on the original plate (the motor is rotated forward by more than X4 pulse) and the condition for transporting a fixed amount after the trailing end of the original newly inserted document passes sensor 29 (the motor is rotated forward by X3 after the trailing end is detected) are established. By this procedure, the original set on the original plate can be exited securely and also the inserted original can pass the stopper (stop position). In this case, as described above, it does not matter whether the original is exited completely from the exit port or not. That is, the transportation in a reverse direction has no influence on the original. When exiting only, it is unnecessary to establish a condition regarding the trailing end of the original. When the exit condition is established, the operation can be finished.

Although only several preferred embodiments have been described in detail above, those skilled in the art will readily appreciate that many modifications are possible in the preferred embodiments without materially departing from the novel techniques and advantages of this invention. Accordingly, all such modifications are intended to be covered by this invention as described in the following claims.

What is claimed is:

1. A document feeder for feeding an original document to a predetermined stop position whereat it is stopped, and then removing the document from that predetermined position, comprising:
   an original document feed port for receiving the original document placed thereat;
   an original document exit port for exiting the original document;
   transportation means for feeding the original document placed at said original document feed port from said original feed port toward said original exit port until a trailing end of the original document passes a stop position and a previous original is exited from said original exit port and then feeding in a reverse direction the original document for a distance where the trailing end of the original document is positioned at said stop position;
   selection means for selecting a sheet size of said original document;
   detecting means for detecting a transport distance of said original after said trailing end passes said stop position, said detecting means including pulse counter means for detecting said distance and
   processor means, coupled to said detecting means and said selection means, for controlling said transportation means by comparing said original transport distance with predetermined values based on said sheet size.

2. A document feeder according to claim 1, wherein said transportation means includes:
   means for (a) detecting the presence of an original inserted at said original feed port, and (b) detecting a previous original on an original plate; and
   driving means for transporting the original in response to the detected presence of the original and the absence of the previous original.

3. A document feeder according to claim 1, wherein said original document feed port is provided on one side of the stop position and said original document exit port is provided on the other side of the stop position.

4. A document feeder according to claim 1 wherein said transportation means includes transporting rollers which rotate to transport said original document, and wherein said detecting means includes:
- a sensor for detecting a rotation amount of said transporting rollers and generating pulses indicative thereof,
- a first counter for storing the number of said pulses detected by said sensor, and
- a second counter for periodically storing the count value of said first counter.

5. A method of feeding an original document in a document feeder having an original document feed port and an original document exit port, said method comprising the steps:
- selecting a sheet size of said original document;
- first transporting the original document inserted at said original document feed port toward said original document exit port until a trailing end of the original document passes a predetermined stop position and a previous original document is exited;
- detecting, using a pulse counter, a transport distance of said original document after said trailing end passes said stop position;
- second transporting the original document in a reverse direction for a distance where the trailing end of the original document is positioned at the stop position; and
- controlling said second transporting step by comparing the original transport distance with predetermined values based on said sheet size.

6. A method of feeding an original document according to claim 5, wherein said first step of transporting includes the steps of:
- detecting the presence of an original inserted at said original feed port;
- detecting the presence of a previous original on an original plate; and
- transporting said original in response to the detected presence of said original and the absence of said previous original.

* * * * *